United States Patent
Nagelrauf

(10) Patent No.: US 10,697,794 B2
(45) Date of Patent: Jun. 30, 2020

(54) FLIGHT-PATH DETERMINATION DEVICE AND FLIGHT-PATH DETERMINATION METHOD

(71) Applicant: MBDA Deutschland GmbH, Schrobenhausen (DE)

(72) Inventor: Bernd Nagelrauf, Gröbenzell (DE)

(73) Assignee: MBDA DEUTSCHLAND GMBH, Schrobenhausen (DE)

( * ) Notice: Subject to any disclaimer, the term of this patent is extended or adjusted under 35 U.S.C. 154(b) by 250 days.

(21) Appl. No.: 15/852,697

(22) Filed: Dec. 22, 2017

(65) Prior Publication Data

US 2018/0202832 A1    Jul. 19, 2018

(30) Foreign Application Priority Data

Dec. 23, 2016   (DE) .................. 10 2016 015 689

(51) Int. Cl.
| | |
|---|---|
| *G01S 13/58* | (2006.01) |
| *G01C 23/00* | (2006.01) |
| *F41H 11/02* | (2006.01) |
| *G01S 13/72* | (2006.01) |
| *G01S 13/88* | (2006.01) |
| *G08G 5/02* | (2006.01) |
| *G01S 13/86* | (2006.01) |
| *F41G 7/22* | (2006.01) |

(52) U.S. Cl.
CPC ........... *G01C 23/005* (2013.01); *F41H 11/02* (2013.01); *G01S 13/58* (2013.01); *G01S 13/72* (2013.01); *G01S 13/883* (2013.01); *G08G 5/025* (2013.01); *F41G 7/224* (2013.01); *G01S 13/86* (2013.01)

(58) Field of Classification Search
CPC ....... G01C 23/005; G01C 23/00; F41H 11/02; G01S 13/58; G01S 13/72; G01S 13/883; G01S 13/86; G08G 5/025; G08G 5/0039; G08G 5/0034; G08G 5/0003; G08G 5/0091; G08G 5/02; F41G 7/224; G05D 1/101
USPC ..... 701/533, 300, 301, 4, 416; 340/951, 973
See application file for complete search history.

(56) References Cited

U.S. PATENT DOCUMENTS

| | | | |
|---|---|---|---|
| 3,724,783 A * | 4/1973 | Nolan, Jr. ............. | F41G 7/2206 244/3.15 |
| 5,086,396 A * | 2/1992 | Waruszewski, Jr. .... | F41G 7/343 701/300 |
| 5,289,185 A * | 2/1994 | Ramier ................ | G01C 23/005 340/971 |
| 5,408,414 A | 4/1995 | Nomoto et al. | |

(Continued)

FOREIGN PATENT DOCUMENTS

| | | |
|---|---|---|
| EP | 2 348 328 A2 | 7/2011 |
| JP | 2000 155036 A | 6/2000 |
| JP | 2014 145697 A | 8/2014 |

*Primary Examiner* — Richard A Goldman
(74) *Attorney, Agent, or Firm* — Jenkins, Wilson, Taylor & Hunt, P.A.

(57) ABSTRACT

A flight-path determination device for determining a flight path of a flying object has a position determination apparatus to detect a position of the flying object, an alignment apparatus that to verify whether the position of the flying object is within one specified approach path of a number of specified approach paths, and a path determination apparatus to output the relevant approach path as the flight path of the flying object if the position of the flying object is within one of the specified approach paths.

12 Claims, 6 Drawing Sheets

(56) References Cited

U.S. PATENT DOCUMENTS

| | | | |
|---|---|---|---|
| 8,344,911 B1* | 1/2013 | Wenger | G01C 23/00 340/973 |
| 8,415,596 B2 | 4/2013 | Dold et al. | |
| 8,515,609 B2* | 8/2013 | McAndrew | G05D 1/0038 701/23 |
| 8,970,402 B1* | 3/2015 | Innis | G01C 23/005 340/945 |
| 9,368,035 B2* | 6/2016 | Mere | G05D 1/101 |
| 10,370,093 B1* | 8/2019 | Beckman | G08G 5/045 |
| 2005/0150997 A1 | 7/2005 | Sjanic | |
| 2005/0182530 A1* | 8/2005 | Murphy | G01C 23/00 701/16 |
| 2005/0261811 A1* | 11/2005 | Artini | G01C 5/005 701/3 |
| 2007/0129857 A1* | 6/2007 | Fortier | G08G 5/0039 701/16 |
| 2008/0172149 A1* | 7/2008 | Rouquette | G01C 21/00 701/16 |
| 2010/0017114 A1 | 1/2010 | Tehan et al. | |
| 2010/0026525 A1* | 2/2010 | Feyereisen | G01C 5/005 340/972 |
| 2010/0145552 A1 | 6/2010 | Herman et al. | |
| 2011/0174917 A1 | 7/2011 | Dold et al. | |
| 2013/0013131 A1* | 1/2013 | Yakimenko | B64D 17/00 701/3 |
| 2013/0238174 A1* | 9/2013 | Dewas | G05D 1/0676 701/16 |
| 2014/0019038 A1* | 1/2014 | Shehi | G01C 23/00 701/416 |
| 2014/0097972 A1* | 4/2014 | Barraci | G01C 23/005 340/971 |
| 2014/0249738 A1* | 9/2014 | Euteneuer | G01S 13/9303 701/301 |
| 2015/0081197 A1* | 3/2015 | Gaertner | G08G 5/0021 701/120 |
| 2015/0276355 A1 | 10/2015 | Komukai | |
| 2016/0117932 A1* | 4/2016 | Park | G01S 19/39 701/3 |
| 2017/0057634 A1* | 3/2017 | Hunt | B64C 39/024 |
| 2017/0160546 A1* | 6/2017 | Bull | G02B 27/0172 |
| 2017/0199269 A1* | 7/2017 | Allen | G01S 5/12 |
| 2018/0024237 A1* | 1/2018 | Laplace | B64D 45/04 |
| 2018/0202832 A1* | 7/2018 | Nagelrauf | F41H 11/02 |
| 2019/0033885 A1* | 1/2019 | Candido | G05D 1/042 |
| 2019/0033886 A1* | 1/2019 | Candido | G08G 5/0034 |
| 2019/0052349 A1* | 2/2019 | Russell | H04B 7/18504 |
| 2019/0159444 A1* | 5/2019 | Schwartz | A01M 29/06 |

\* cited by examiner

FLIGHT-PATH DETERMINATION DEVICE AND FLIGHT-PATH DETERMINATION METHOD

CROSS-REFERENCE TO RELATED APPLICATION

This application claims priority to German patent application DE 10 2016 015 689.9 filed Dec. 23, 2016, the entire disclosure of which is incorporated by reference herein.

TECHNICAL FIELD

The present disclosure relates to a flight-path determination device and to a corresponding flight-path determination method.

BACKGROUND

Systems for determining a flight path of a flying object are used in a range of applications. In particular, systems of this kind can be used for air defence, for example.

In particular in a conflict situation, it is advantageous to know the destinations or the routes to the destinations used for example by enemy aircraft.

For this purpose, the current flight route, i.e. the direction of flight for example of an aircraft when entering the detection region of a radar, is usually detected and extrapolated. This extrapolation can be linear, for example.

SUMMARY

It is an idea of the present disclosure is to provide improved flight-path determination.

Accordingly, the following is provided:

a flight-path determination device for determining a flight path of a flying object, comprising a position determination apparatus that is designed or configured to detect a position of the flying object, comprising an alignment apparatus that is designed or configured to verify whether the position of the flying object is within one specified approach path of a number of specified approach paths, and comprising a path determination apparatus that is designed or configured to output the relevant approach path as the flight path of the flying object if the position of the flying object is within one of the specified approach paths.

The following is also provided:

a flight-path determination method for determining a flight path of a flying object, comprising detecting the position of the flying object, verifying whether the position of the flying object is within one specified approach path of a number of specified approach paths, and outputting the relevant approach path as the flight path of the flying object if the position of the flying object is within one of the specified approach paths.

The present disclosure is based on the knowledge that, in a conflict, flying objects, for example aircraft or helicopters, usually wish to reach their destination undetected, or in a manner that is as protected as possible.

The present disclosure uses this knowledge and determines the flight path of a flying object not solely based on the current position or current flight direction thereof, but using a database for this purpose, which comprises a range of possible approach paths for flying objects. Approach paths are to be understood in this case as flight paths which lead towards potential destinations of the flying objects and have been identified as advantageous in advance, for example because they offer the flying object special protection. This is the case for example in a valley or gorge. The approach paths can be identified manually or by machine.

Thus, if a flying object is detected for example within the range of the position determination apparatus, for example a radar, the position of the flying object can also be detected by the position determination apparatus.

If the alignment apparatus recognizes that the position of the flying object is within one of the specified approach paths, the present disclosure assumes that the flying object will follow the approach path since the path is advantageous for the flying object, and this can prevent for example premature discovery or interception attempts. The disclosure herein thus does not assume that a flying object always uses the direct route to reach a destination, but that the object accepts advantageous detours.

The path determination apparatus will then output the approach path in which the current position of the flying object is located as the flight path of the flying object.

The flight path can then be represented for example visually on a screen or a projection surface.

By including knowledge about the territory through which a flying object is flying, the present disclosure can ascertain the flight path of a flying object with very little computing effort.

It is clear that a flying object for which a flight path has already been ascertained can be monitored constantly, and a new flight path can be ascertained if there is a deviation from the ascertained flight path.

In one embodiment, the flight-path determination device can comprise a destination database of potential flight destinations, it being possible for the approach paths to comprise flight paths to the potential flight destinations, and it being possible for the approach paths to be generated in particular automatically or semi-automatically based on an analysis of topographic maps. The potential flight destinations may be specified for example for specific regions or areas. The choice of potential flight destinations can in this case be made for example by experts and/or appropriate algorithms that determine a risk situation for all possible destinations and specify destinations that are particularly at risk as potential flight destinations. Such destinations may be for example power stations, bridges, military facilities, or similar. Automatically determining the approach paths allows for example terrain forms to be analyzed and paths to be determined that allow a protected approach to a destination of this kind. Semi-automatically determining the possible approach paths may for example comprise appropriately qualified staff evaluating or adapting the automatically determined approach paths.

In one embodiment, the path determination apparatus can comprise a distance determination apparatus that can be designed or configured to determine the distance between the flying object and the potential flight destinations if the position of the flying object is not within one of the specified approach paths, and to determine the position of the potential flight destination that is closest to the flying object as the end of the flight path of the flying object. If the flying object is not located in one of the approach paths, the present disclosure assumes that the flying object wishes to reach the flight destination that is closest to it. For this purpose, the current position of the flying object can be compared with the positions of the individual flight destinations. In the process, for example only those flight destinations which lie ahead of the flying object, i.e. within a "bearing angle" of +/−90° relative to the object, can be investigated as potential flight destinations. The bearing angle can also be defined as the angle between the current directional vector of the flying object and the straight connecting line between the flying object and the relevant flight destination. In the case of larger flight destinations, or flight destinations having a planar expansion, the smallest angle between the directional vector and the straight connecting line from the flying object to the edge or boundary of the relevant flight destination can be used for the determination in each case.

In one embodiment, if a plurality of potential flight destinations are at the same distance from the flying object, the distance determination apparatus can be designed or configured to select the flight destination of which the connecting line to the flying object has the smallest angle relative to the current directional vector of the flying object. "Same distance" can be understood to mean approximately the same or similar distances that differ only by a specified threshold value for example. Since a flying object will usually attempt to reach its destination via the most direct or shortest route possible, the probable destination of the flying object can be determined very easily by determining the angle between the flying object and the relevant flight destination and the directional vector of the flying object.

In one embodiment, the path determination apparatus can be designed or configured to output a direct connecting line or straight connecting line between the current position of the flying object and the determined end of the flight path as the flight path of the flying object, if the position of the flying object is not within one of the specified approach paths. Assuming a direct line as the flight path makes it possible to very simply calculate the flight path on the basis of the current position of the flying object and the position of the chosen flight destination.

In one embodiment, the path determination apparatus can be designed or configured to output an interpolated connecting line between an existing flight route of the flying object and the determined end of the flight path as the flight path of the flying object. For example polynominal interpolation or spline interpolation can be used as the interpolation. By the interpolation, the existing flight route of the flying object can be taken into account for example by incorporating points on the existing flight route into the interpolation. A more realistic flight path to the flight destination can thus be determined.

In one embodiment, the path determination apparatus can be designed or configured to determine whether one of the specified approach paths leads to the flight destination determined as the end of the flight path, and to output the relevant approach path as a portion of the flight path of the flying object if there is a point of entry into the approach path between the flying object and the corresponding flight destination. If one of the approach paths for the flying object is conveniently located, it is probable that the flying object will adjust its course and use the corresponding approach path in order to reach the flight destination. The path determination apparatus can output for example a linear path from the current position of the flying object to the point of entry, and output the further course of the approach path to the flight destination as the flight path. An approach path can then for example be considered to be, or output as, part of the flight path if the approach path is located within a specified angle relative to the current directional vector of the flying object, e.g. a maximum of +/−90°, and relative to the flight destination.

An approach path is certainly not considered to be convenient if there is no suitable point of entry between the current position of the flying object and the flight destination. Although all the points on the approach path can act as points of entry, it is not necessarily sensible to also use a point of entry of this kind, since this would result in for example a significant detour. The path determination apparatus can therefore make an assumption, for example using specified criteria, as to whether or not the flying object will pivot into the relevant approach path.

In one embodiment, the path determination apparatus can be designed or configured to identify the point on the approach path that has the shortest distance from the flying object as the point of entry, or the apparatus can be designed or configured to calculate the length of a detour that a flying object has to travel in order to reach an approach path to the flight destination, and to only recognize a point of entry into the approach path if the calculated detour is below a specified threshold value, it being possible for the specified threshold value to be provided in particular as a percentage of the distance between the flying object and the flight destination. If an aircraft is located on the route to a flight destination, the aircraft will usually attempt to reach the destination in a well-protected manner, and will also use the terrain as cover for this purpose. The present disclosure therefore assumes, in one embodiment, that the aircraft will use the approach path in all circumstances. Alternatively, the extent of the detour that the flying object has to accept in order to be able to use the approach path can be calculated. The fact that the flying object wishes to reach its destination as quickly as possible, and therefore cannot accept any detour, can thus be taken into consideration. The threshold value for the detour can be e.g. 10%-100%, 20%-80% or 50%.

It is clear that for example an identification apparatus that is designed or configured to identify whether a detected flying object is actually relevant can also be provided. For example, the flight path calculation may be applied only to enemy aircraft, and can be suspended for friendly aircraft. The relevance of the aircraft can also be restricted to a predefined territory.

The above embodiments and developments can, where useful, be combined with one another as desired. Further possible embodiments, developments and implementations of the disclosure herein also include not-explicitly stated combinations of features of the disclosure herein that have been described above, or will be described below, in relation to the embodiments. In particular, a person skilled in the art will also add individual aspects as improvements or additions to the relevant basic form of the present disclosure.

It is clear that the individual elements of the present disclosure can be designed as hardware, software or a combination of hardware and software. In particular, the functions of individual elements can also be combined into one component, or the functions can be otherwise partitioned.

BRIEF DESCRIPTION OF THE DRAWINGS

The present disclosure is explained in more detail in the following on the basis of the embodiments provided in the schematic figures in the example drawings, in which.

Unless otherwise stated, like or functionally like elements and devices are provided with the same reference sign, incremented by 100 in all the figures.

DETAILED DESCRIPTION

Figure 1:
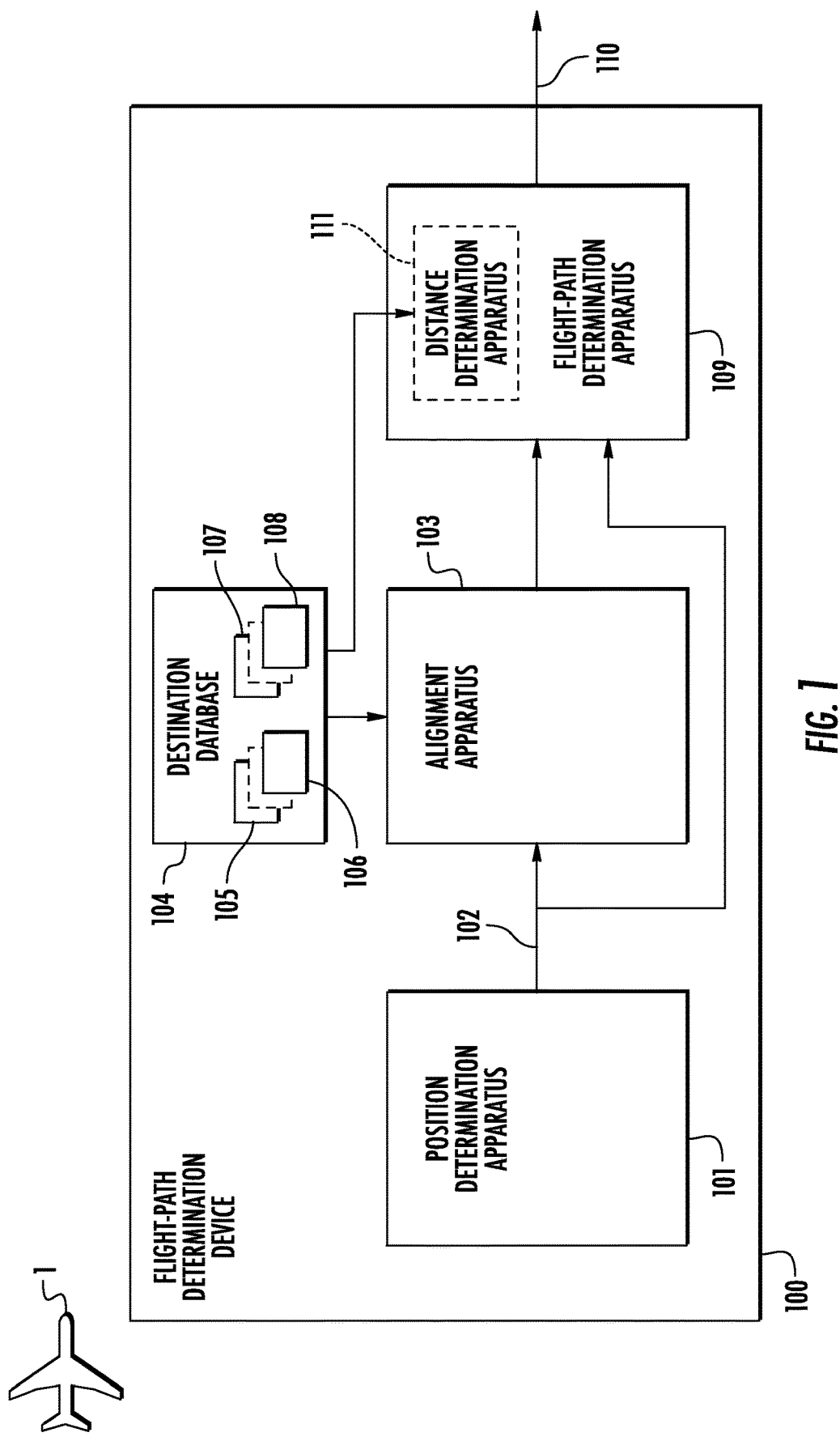
FIG. 1 is a block diagram of one embodiment of a flight-path determination device according to the disclosure herein.

The flight-path determination device 100 in FIG. 1 comprises a position determination apparatus 101 that is coupled to an alignment apparatus 103. The alignment apparatus 103 is coupled to a destination database 104 and to a flight-path determination apparatus 109.

The position determination apparatus 101 may for example be designed as an individual radar, as a networked radar system comprising a plurality of radar sensors, or as any kind of apparatus that can detect the position 102 of the flying object 1. The position determination apparatus 101 forwards the detected position 102 to the alignment apparatus 103. The alignment apparatus 103 can read out various approach paths 105, 106 from the destination database 104 and align the paths with the current position 102 of the flying object 1. Only the approach paths 105, 106 are shown in the destination database 104. Other approach paths are indicated by boxes drawn in dashed lines. The approach paths 105, 106 denote paths which a flying object 1 could advantageously use in order to draw close to the flight destinations 107, 108. For example, the approach paths 105, 106 can offer special protection to the flying object 1. Potential flight destinations 107, 108 are also stored in the destination database 104.

If the flying object 1 is located within one of the approach paths 105, 106, the alignment apparatus 103 forwards this information to the path determination apparatus 109, which then outputs the relevant approach path 105, 106 as the flight path 110 of the flying object 1.

If the flying object 1 is not located within any of the approach paths 105, 106, the path determination apparatus 109 can output a direct line between the flying object 1 and the flight destination 107, 108 as the flight path 110.

If, however, a plurality of flight destinations 107, 108 are located close to the flying object 1 or ahead of the flying object 1, the path determination apparatus 109 has to select one of the destinations. For this purpose, the path determination apparatus 109 can optionally (shown by dotted lines) comprise for example a distance determination apparatus 111.

The distance determination apparatus 111 can determine the distance between the flying object 1 and the potential flight destinations 107, 108. The position of the potential flight destination 107, 108 that is closest to the flying object 1 can then be output as the end of the flight path 110 of the flying object 1. This is explained in detail in conjunction with FIG. 2.

If a plurality of potential flight destinations 107, 108 are at the same or a similar distance from the flying object 1, the distance determination apparatus 111 can be designed or configured to measure the angle between the connecting line from the relevant flight destination 107, 108 to the flying object 1, and the current directional vector of the flying object 1. The flight destination 107, 108 of which the connecting line to the flying object 1 has the smallest angle relative to the current directional vector of the flying object 1 can then be output as the end of the flight path 110. This is explained in detail in conjunction with FIG. 3.

The direct connecting line between the flying object 1 and the end of the flight path 110 can for example always be output as the flight path 110. Alternatively, however, an interpolated connecting line between an existing flight route of the flying object 1 and the determined end of the flight path 110 can also be output as the flight path 110.

The path determination apparatus 109 can, however, also determine whether one of the specified approach paths 105, 106 leads to the flight destination 107, 108 determined as the end of the flight path 110. If this is the case, the path determination apparatus 109 can investigate whether the relevant approach path 105, 106 is suitable as a portion of the flight path 110 and incorporate the approach path into the output flight path 110 of the flying object 1, at least if there is a point of entry into the approach path 105, 106 between the flying object 1 and the corresponding flight path 107, 108, 207.

The path determination apparatus 109 can for example identify the point on the approach path 105, 106 that has the smallest distance from the flying object 1 as the point of entry. In addition, the path determination apparatus 109 can, however, also verify criteria which state whether the relevant approach path 105, 106 is actually suitable for, or could be of interest to, the flying object 1.

For example, the path determination apparatus 109 can calculate the length of a detour that a flying object 1 has to travel in order to reach an approach path 105, 106 to the flight destination 107, 108. The approach path 105, 106 can be considered to be suitable for example if the calculated detour is below a specified threshold value. The specified threshold value may for example be provided as a percentage of the distance between the flying object 1 and the flight destination 107, 108, or as an absolute value. If the relevant approach path 105, 106 is therefore suitable, the point on the approach path 105, 106 that is closest to the flying object 1 can be determined as the point of entry into the approach path 105, 106.

Figure 2:
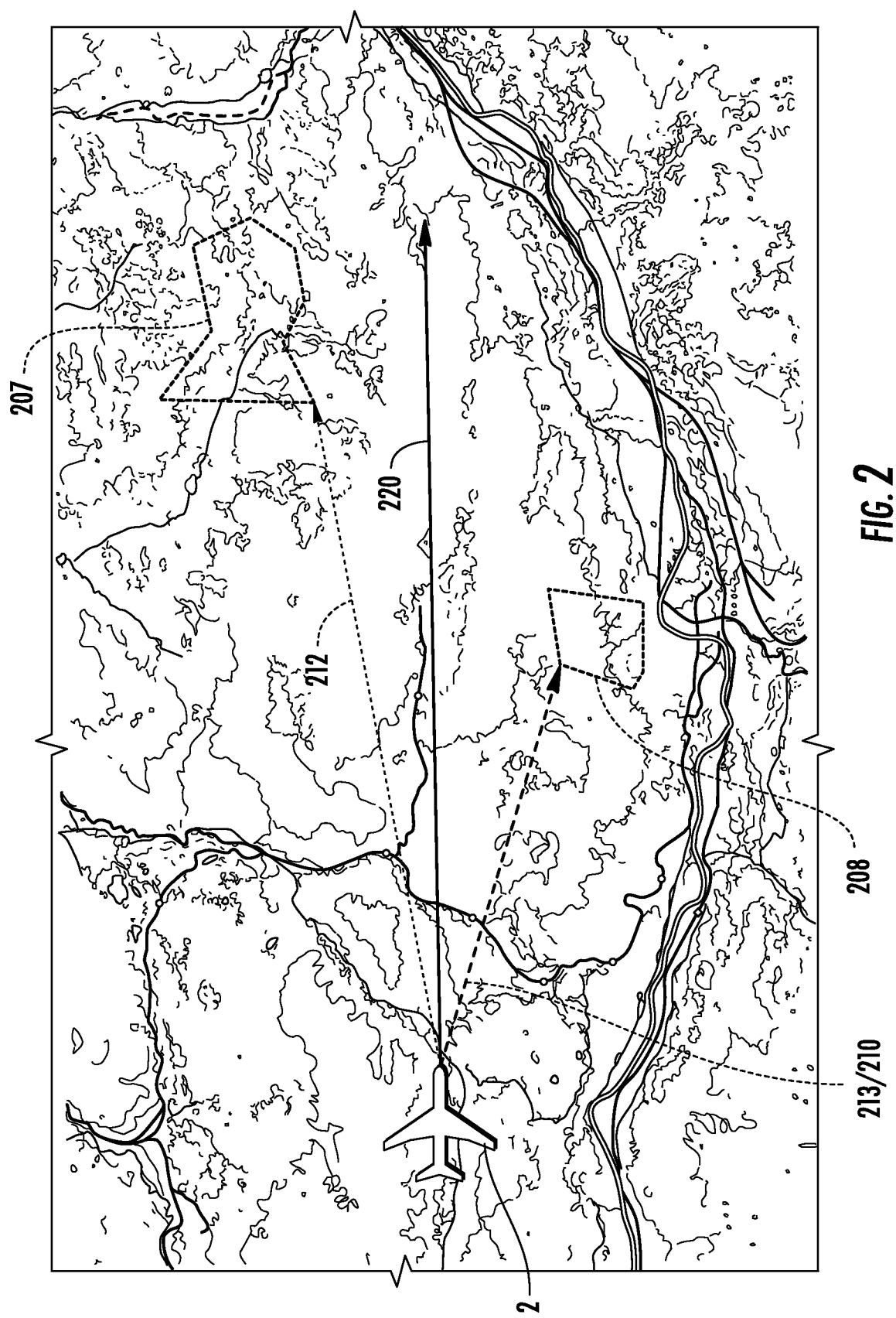
FIG. 2 is a map showing a flying object in order to illustrate the present disclosure.

FIG. 2 shows an excerpt from a map, on which an aircraft 2 is shown. The position of the aircraft 2 can be detected for example by the position determination apparatus 101, for example by a radar. By a position determination apparatus 101, the current direction of movement of the aircraft 2 or the directional vector 220 thereof can also be detected. Two potential flight destinations 207 and 208 are also shown on the map in FIG. 2. In order to determine the flight path 210 of the aircraft 2, the path determination apparatus 109 or the distance determination apparatus 111 calculates the distance 212 between the first flight destination 207 and the aircraft 2, and the distance 213 between the second flight destination 208 and the aircraft 2. The flight destination 207, 208 that is closest to the aircraft 2 is output as the actual destination thereof. In FIG. 2, the flight destination 208 is closer to the aircraft 2. As such, the flight path 210 is output as a straight line between the aircraft 2 and the flight destination 208.

Figure 3:
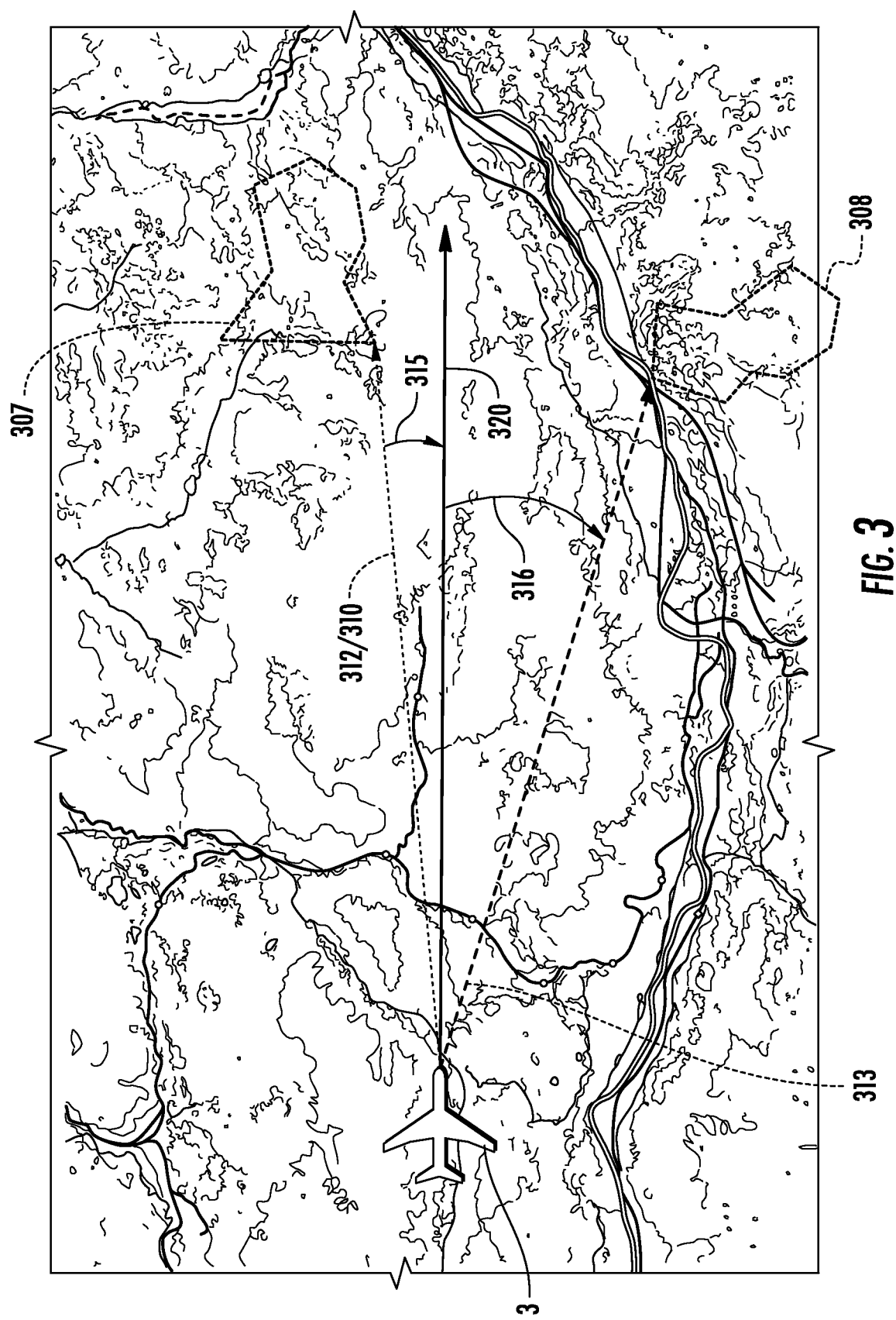
FIG. 3 is another map showing a flying object in order to illustrate the present disclosure.

FIG. 3 shows the same map excerpt shown in FIG. 2. However, in FIG. 3 the flight destinations 307, 308 are approximately equidistant from the aircraft 3.

The path determination apparatus 109 thus determines the angles 315, 316 between the directional vector 320 of the aircraft 2 and the connecting lines between the aircraft 3 and the flight destinations 307, 308. If the distances 312, 313 are similar or (at least within specified limits) the same, the flight destination 307, 308 of which the angle 315, 316 is the smallest is output as the flight destination. This is the flight destination 307 in this case. FIG. 3 also shows the flight path 310 as a straight line between the aircraft 3 and the flight destination 307. It is clear that an interpolated curve could also be output as the flight path instead of a straight line.

In addition, the path determination apparatus 109 can for example also dynamically adjust the flight path 310 to the terrain. For example, the path determination apparatus 109 can guide the flight path 310 around mountains if the flight path were to cross them.

The views shown in FIGS. 2 and 3 assume that there is no approach path between the aircraft 2, 3 and the flight destinations 207, 208, 307, 308.

Figure 4:
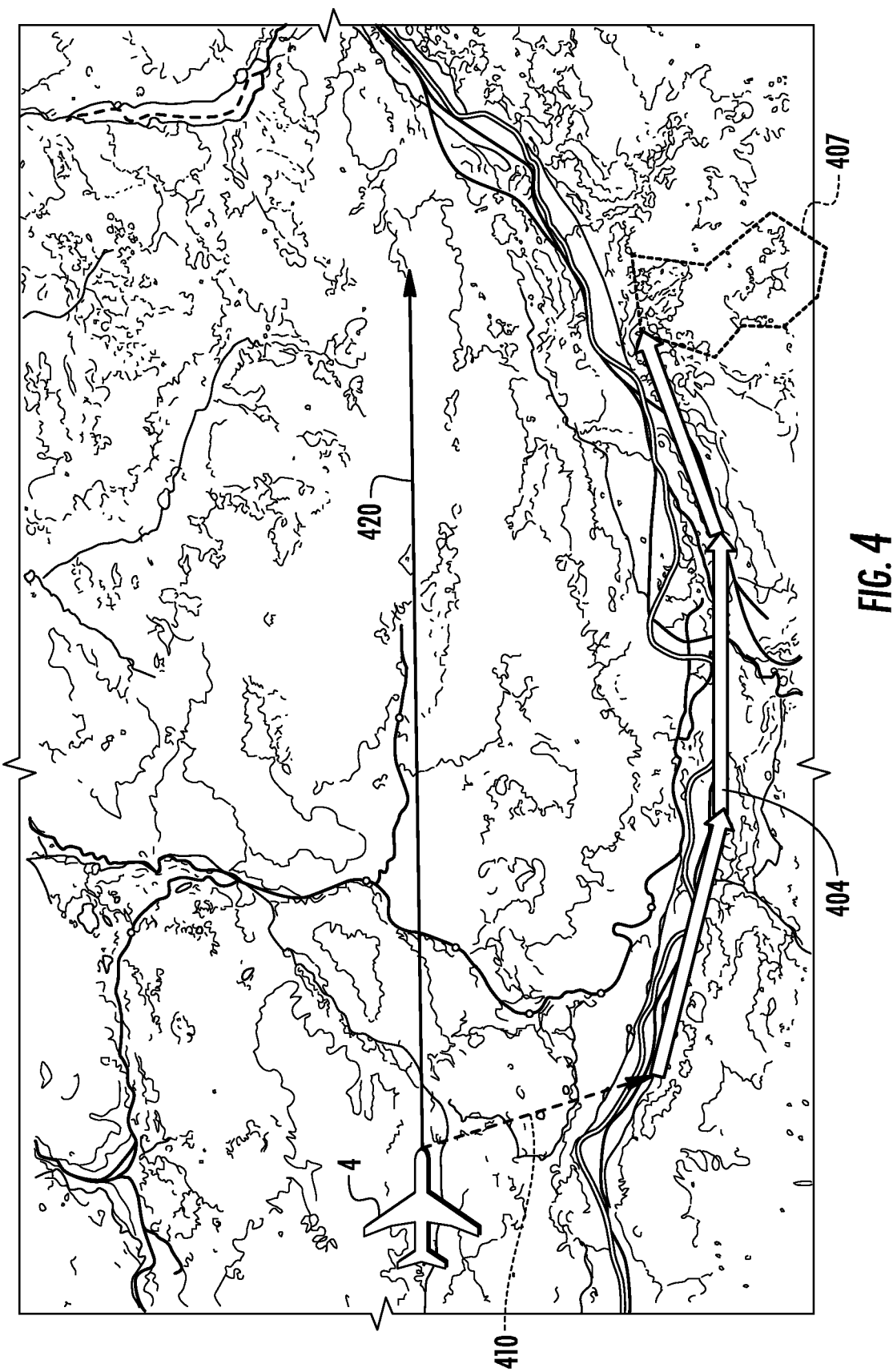
FIG. 4 is another map showing a flying object in order to illustrate the present disclosure.

FIG. 4, however, shows an approach path 404 to the sole flight destination 407 in FIG. 4. The aircraft 4 is located north of the approach path 404, and the directional vector 420 of the aircraft 4 is somewhat parallel to the approach path 404.

Since the flight destination 407 is the sole flight destination in the vicinity of the aircraft 4, the route from the current position of the aircraft 4 to the approach path 404, and subsequently the approach path 404, is output as the flight path 410. In addition, the possible extent of a detour for the aircraft 4 in comparison with a direct flight can still be verified before a flight path 410 of this kind is output. The flight path 410 along the approach path 404 can then for example be output if the detour is below a specific threshold.

Figure 5:
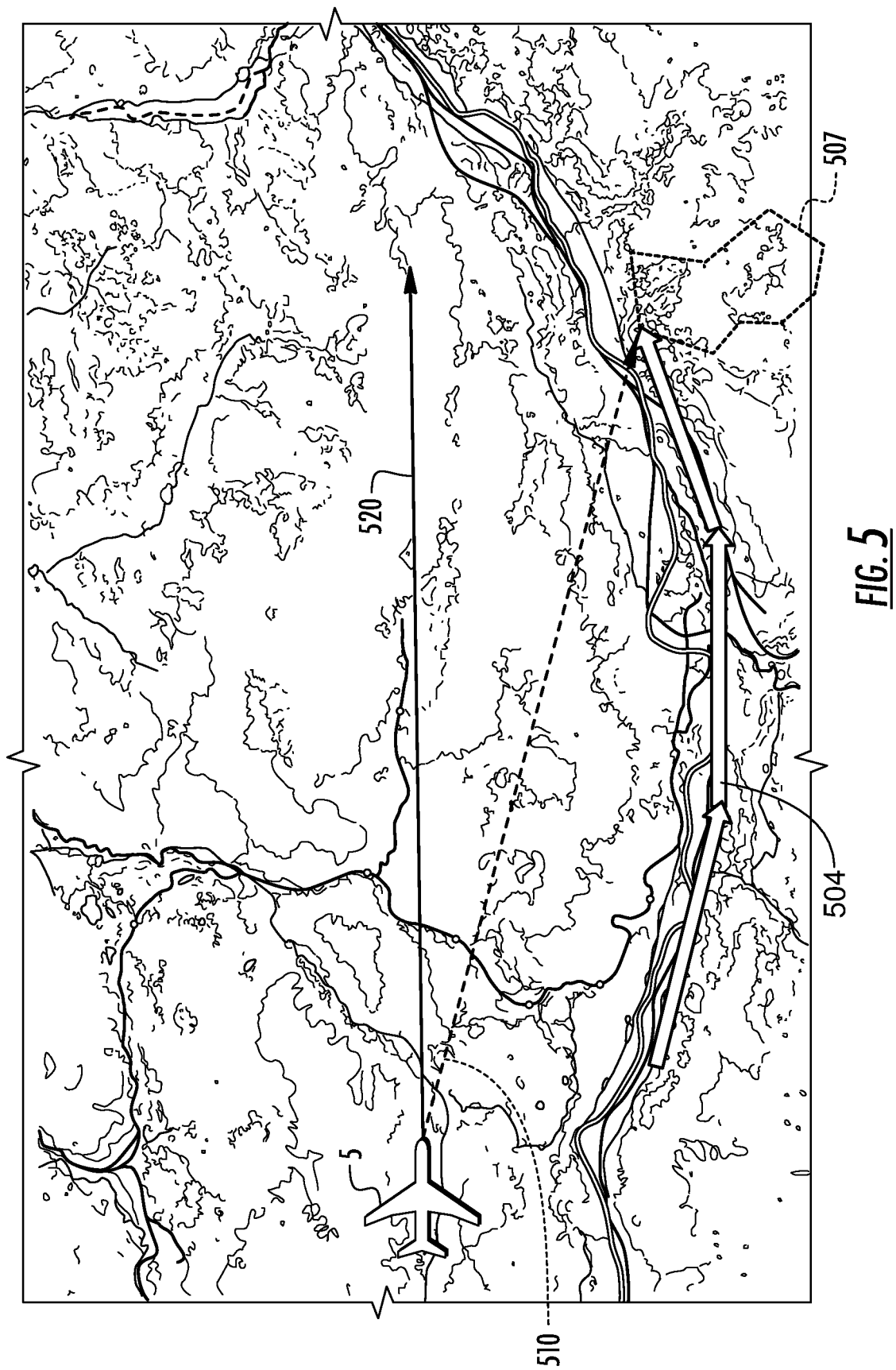
FIG. 5 is another map showing a flying object in order to illustrate the present disclosure.

FIG. 5 shows the situation from FIG. 4, although here the detour from the approach path 504 is too great, and therefore the direct route between the current position of the aircraft 5 and the flight destination 507 is output as the flight path 510.

Figure 6:
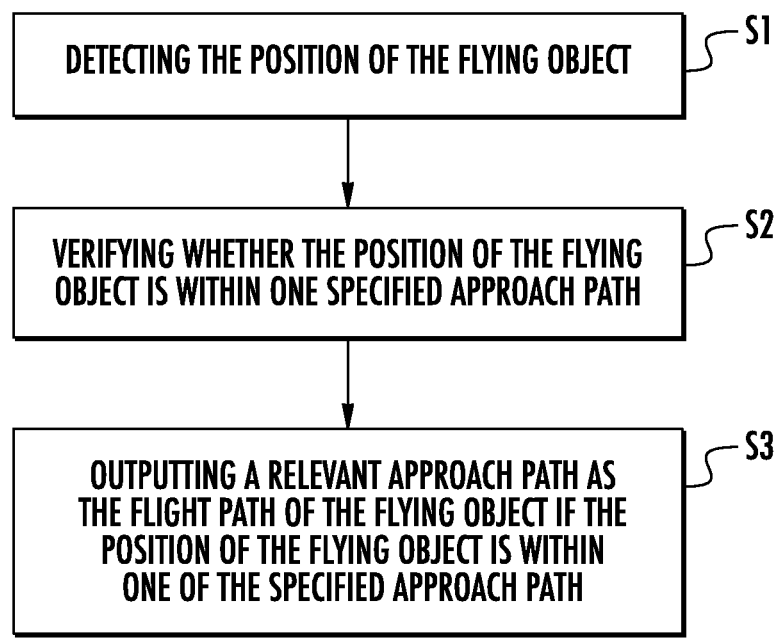
FIG. 6 is a flow chart of one embodiment of a flight-path determination method according to the disclosure herein.

FIG. 6 shows a flight-path determination method for determining a flight path 110, 210, 310, 410, 510 of a flying object 1, 2, 3, 4, 5. The reference signs for FIG. 1-5 are maintained for the description of the flight-path determination method for better understanding of the explanations of the flight-path determination method.

The flight-path determination method comprises detecting S1 the position 102 of the flying object 1, 2, 3, 4, 5. In addition, it is verified S2 whether the position 102 of the flying object 1, 2, 3, 4, 5 is within one specified approach path 105, 106, 404, 504 of a number of specified approach paths 105, 106, 404, 504. If the position 102 of the flying object 1, 2, 3, 4, 5 is within one of the specified approach paths 105, 106, 404, 504, the relevant approach path 105, 106, 404, 504 is output as the flight path 110, 210, 310, 410, 510 of the flying object 1, 2, 3, 4, 5.

The approach paths 105, 106, 404, 504 can comprise flight paths 110, 210, 310, 410, 510 to the potential flight destinations 107, 108, 207, 208, 307, 308, 407, 507, and can be stored in a destination database 104 of potential flight destinations 107, 108, 207, 208, 307, 308, 407, 507. The approach paths 105, 106, 404, 504 can for example be generated automatically or semi-automatically based on an analysis of topographic maps.

If the position 102 of the flying object 1, 2, 3, 4, 5 is not within one of the specified approach paths 105, 106, 404, 504, however, the distance 212, 213, 312, 313 between the flying object 1, 2, 3, 4, 5 and the potential flight destinations 107, 108, 207, 208, 307, 308, 407, 507 can be determined. In addition, the position of the potential flight destination 107, 108, 207, 208, 307, 308, 407, 507 that is closest to the flying object 1, 2, 3, 4, 5 can be determined as the end of the flight path 110, 210, 310, 410, 510 of the flying object 1, 2, 3, 4, 5.

If a plurality of potential flight destinations 107, 108, 207, 208, 307, 308, 407, 507 are at the same distance 212, 213, 312, 313 from the flying object 1, 2, 3, 4, 5, the flight destination 107, 108, 207, 208, 307, 308, 407, 507 of which the connecting line to the flying object 1, 2, 3, 4, 5 has the smallest angle 315, 316 relative to the current directional vector of the flying object 1, 2, 3, 4, 5 can be determined as the end of the flight path 110, 210, 310, 410, 510 of the flying object 1, 2, 3, 4, 5.

The flight path 110, 210, 310, 410, 510 may for example be output as a direct connecting line between the current position 102 of the flying object 1, 2, 3, 4, 5 and the determined end of the flight path 110, 210, 310, 410, 510, if the position 102 of the flying object 1, 2, 3, 4, 5 is not within one of the specified approach paths 105, 106, 404, 504. Alternatively, an interpolated connecting line between an existing flight route of the flying object 1, 2, 3, 4, 5 and the determined end of the flight path 110, 210, 310, 410, 510 can be output as the flight path 110, 210, 310, 410, 510 of the flying object 1, 2, 3, 4, 5.

Finally, it can be determined whether one of the specified approach paths 105, 106, 404, 504 leads to the flight destination 107, 108, 207, 208, 307, 308, 407, 507 determined as the end of the flight path 110, 210, 310, 410, 510, and the relevant approach path 105, 106, 404, 504 can be output as a portion of the flight path 110, 210, 310, 410, 510 of the flying object 1, 2, 3, 4, 5 if there is a point of entry into the approach path 105, 106, 404, 504 between the flying object 1, 2, 3, 4, 5 and the corresponding flight destination 107, 108, 207, 208, 307, 308, 407, 507.

The point on the approach path 105, 106 which has the shortest distance from the flying object 1, 2, 3, 4, 5 can be identified as the point of entry. Alternatively, for example the length of a detour that a flying object 1, 2, 3, 4, 5 has to travel in order to reach an approach path 105, 106, 404, 504 to the flight destination 107, 108, 207, 208, 307, 308, 407, 507 can be calculated. A suitable point of entry into the approach path 105, 106, 404, 504 can for example only be recognized if the calculated detour is below a specified threshold value. This can be provided for example as a percentage of the distance between the flying object 1, 2, 3, 4, 5 and the flight destination 107, 108, 207, 208, 307, 308, 407, 507, or as an absolute value.

It is clear that a flying object can be monitored constantly and continuously by the present disclosure. If the course of the flying object deviates from the output flight path, for example a new flight path can thus be calculated.

Although the present disclosure has been described above on the basis of various embodiments, it is not limited thereto, but can be modified in many ways. In particular, the disclosure herein can be altered or modified in various ways, without departing from the basic concept of the disclosure herein.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight-path determination device for determining a flight path of a flying object, comprising:
 a position determination apparatus, comprising a radar, and being configured to detect a position of the flying object;
 an alignment apparatus, comprising circuitry, and being configured to verify whether the position of the flying object is within one specified approach path of a number of specified approach paths; and
 a path determination apparatus, comprising circuitry, and being configured to output a relevant approach path as the flight path of the flying object if the position of the flying object is within one of the specified approach paths; and
 a destination database of potential flight destinations, wherein the approach paths comprise flight paths to the potential flight destinations, and wherein the approach paths are generated automatically or semi-automatically based on an analysis of topographic maps;
 wherein the path determination apparatus comprises a distance determination apparatus, comprising circuitry, and being configured to determine a distance between the flying object and the potential flight destinations if the position of the flying object is not within one of the specified approach paths, and to determine the position of a potential flight destination that is closest to the flying object as an end of the flight path of the flying object; and
 wherein the path determination apparatus is configured to output a direct connecting line between a current position of the flying object and the determined end of the flight path as the flight path of the flying object if the position of the flying object is not within one of the specified approach paths.

2. The flight-path determination device of claim 1, wherein, if a plurality of potential flight destinations are at a same distance from the flying object, the distance determination apparatus is configured to select the flight destination of which a connecting line to the flying object has a smallest angle relative to a current directional vector of the flying object.

3. The flight-path determination device of claim 1, wherein the path determination apparatus is configured to output an interpolated connecting line between an existing flight route of the flying object and the determined end of the flight path as the flight path of the flying object.

4. The flight-path determination device of claim 1, wherein the path determination apparatus is configured to determine whether one of the specified approach paths leads to the flight destination determined as the end of the flight path, and to output the relevant approach path as a portion of the flight path of the flying object if there is a point of entry into the approach path between the flying object and the corresponding flight destination.

5. The flight-path determination device of claim 4, wherein the path determination apparatus is configured to identify a point on the approach path that has a shortest distance from the flying object as the point of entry.

6. The flight-path determination device of claim 4, wherein the path determination apparatus is configured to calculate a length of a detour that a flying object has to travel in order to reach an approach path to the flight destination, and to only recognize a point of entry into the approach path if the calculated detour is below a specified threshold value, wherein the specified threshold value is provided as a percentage of the distance between the flying object and the flight destination.

7. A flight-path determination method for determining a flight path of a flying object, comprising:
 using a radar or other position determination apparatus to detect a position of the flying object;
 verifying whether the position of the flying object is within one of specified approach paths of a number of specified approach paths;
 outputting a relevant approach path as the flight path of the flying object if the position of the flying object is within one of the specified approach paths;
 if the position of the flying object is not within one of the specified approach paths, determining a distance between the flying object and the potential flight destinations, and determining a position of the potential flight destination that is closest to the flying object as an end of the flight path of the flying object; and
 outputting a direct connecting line between the current position of the flying object and the determined end of the flight path as the flight path of the flying object if the position of the flying object is not within one of the specified approach paths;
 wherein the approach paths comprise flight paths to potential flight destinations and are stored in a destination database of potential flight destinations, and wherein the approach paths are generated automatically or semi-automatically based on an analysis of topographic maps.

8. The flight-path determination method of claim 7, further comprising, object if a plurality of potential flight destinations are at a same distance from the flying object, selecting the flight destination of which a connecting line to the flying object has a smallest angle relative to a current directional vector of the flying object.

9. The flight-path determination method of claim 7, comprising outputting an interpolated connecting line between an existing flight route of the flying object and the determined end of the flight path as the flight path of the flying object.

10. The flight-path determination method of claim 7, comprising determining whether one of the specified approach paths leads to the flight destination determined as the end of the flight path, and outputting the relevant approach path as a portion of the flight path of the flying object if there is a point of entry into the approach path between the flying object and the corresponding flight destination.

11. The flight-path determination method of claim 10, further comprising identifying a point on the approach path that has the shortest distance from the flying object as the point of entry.

12. The flight-path determination method of claim 10, further comprising calculating a length of a detour that a flying object has to travel in order to reach an approach path to the flight destination, and recognizing a point of entry into the approach path only if the calculated detour is below a specified threshold value, wherein the specified threshold value is provided as a percentage of the distance between the flying object and the flight destination.

\* \* \* \* \*